US007181426B2

(12) United States Patent
Dutta (10) Patent No.: US 7,181,426 B2
(45) Date of Patent: Feb. 20, 2007

(54) METHOD AND SYSTEMS FOR SPACE RESERVATION ON PARKING LOTS WITH MECHANISMS FOR SPACE AUCTIONING, OVER-BOOKING, RESERVATION PERIOD EXTENSIONS, AND INCENTIVES

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 837 days.

(21) Appl. No.: 09/736,355

(22) Filed: Dec. 14, 2000

(65) Prior Publication Data

US 2002/0077953 A1 Jun. 20, 2002

(51) Int. Cl.
*G06Q 40/00* (2006.01)
(52) U.S. Cl. .............................. 705/37; 705/35; 705/39
(58) Field of Classification Search .................. 705/35, 705/37, 39
See application file for complete search history.

(56) References Cited

U.S. PATENT DOCUMENTS

| 5,029,094 | A | * | 7/1991 | Wong .......................... 705/418 |
| 5,091,727 | A | | 2/1992 | Mahmood |
| 5,432,508 | A | * | 7/1995 | Jackson ..................... 340/932.2 |
| 5,710,557 | A | * | 1/1998 | Schuette .................... 340/932.2 |
| 5,877,704 | A | * | 3/1999 | Yoshida ..................... 340/932.2 |
| 5,910,782 | A | * | 6/1999 | Schmitt et al. ........... 340/995.12 |
| 5,926,798 | A | | 7/1999 | Carter |
| 5,940,481 | A | * | 8/1999 | Zeitman ....................... 705/13 |
| 5,948,040 | A | * | 9/1999 | DeLorme et al. ........... 701/201 |
| 6,006,251 | A | | 12/1999 | Toyouchi et al. |
| 6,490,443 | B1 | * | 12/2002 | Freeny, Jr. .................. 455/406 |

FOREIGN PATENT DOCUMENTS

| EP | 0646897 | 4/1995 |
| EP | 0791906 | 8/1997 |
| JP | 6019929 | 1/1994 |
| JP | 8329390 | 12/1996 |
| JP | 9016898 | 1/1997 |
| JP | 10074300 | 3/1998 |
| JP | 10208197 | 8/1998 |

\* cited by examiner

*Primary Examiner*—Alain L. Bashore
(74) *Attorney, Agent, or Firm*—Marilyn S. Dawkins; Dillon & Yudell LLP (57) ABSTRACT

Disclosed is a computer-driven reservation system for reserving spaces in a parking facility at an airport terminal. The reservation system comprises a central server, a database of locations and associated plurality of spaces, which may be reserved for customer use, and one or more customer terminals on which is displayed a graphical user interface (GUI) for receiving a customer's reservation request and enabling other customer interactions. The central server, database and customer terminals are interlinked via a network. The central server includes a reservation utility that provides a reservation GUI and a printable reservation coupon with reservation information when a space is reserved. In one embodiment, central server comprises an auction utility that monitors the number of spaces available in a particular location and when the number falls below a predetermined number, implements an auction procedure for all of the remaining number of spaces. Each remaining space is then allocated to a highest bidder.

28 Claims, 10 Drawing Sheets

Fig. 1

| Reservation Data <- 12/20/2000 -> | LOCATION A 301 | LOCATION B 303 | LOCATION C 305 |
|---|---|---|---|
| Total # of Spots | 12 | 300 | 25 |
| Spots Available | 3 | 44 | 11 |
| Availability Grid | ~~1~~ ~~2~~ 3 ~~4~~<br>5 ~~6~~ ~~7~~ ~~8~~<br>9 ~~10~~ 11 12 | | |
| Coupon Code Counter | 1001 | 14002 | 433 |

105

309 (Availability Grid)
311 (Coupon Code Counter)

*Fig. 3A*

| Unavailable | LOCATION A | | | |
|---|---|---|---|---|
| 1 | 12/20/2000 - 12/24/2000 | | | |
| 2 | 12/18/2000 - 12/24/2000 | | | |
| <u>4</u> | 12/16/2000 - 12/24/2000 | | | |
| 6 | 12/17/2000 - 12/24/2000 | valet | 3:05 PM | AA FL#226 |
| | | | 5:46 PM | AA FL#431 |
| 7 | 12/20/2000 - 12/24/2000 | | | |
| 9 | 12/20/2000 - 12/24/2000 | | | |
| 10 | 12/20/2000 - 12/24/2000 | valet | 9:00 AM | Delta FL#001 |
| | | | 7:00 PM | Delta FL#023 |
| <u>12</u> | 12/21/2000 - 12/24/2000 | | | |
| Available | LOCATION A | | | |
| 3 | before 12/27/2000 | | | |
| 5 | open (60 days) | | | |
| 8 | 12/20/2000 only after 11:00 AM | | | |
| 11 | 12/20/2000 only after 3:30 PM | | | |
| 13 | Overflow spot | | | |

```
                                                                    420
┌─────────────────────────────────────────────────────────┐
│  ┌─────────────────────────────────────────────────┐    │
│  │ http://www.parkingreservation.com/reservation.html/conf │
│  └─────────────────────────────────────────────────┘    │
│                                                         │
│              Please Confirm Itinerary and Billing       │
│                                                         │
│                 Location: XYZ Airport -Lot 50           │
│                 Reservation IN Date: 11/20/00           │
│                     IN Time: 8:45 AM                    │
│                 Reservation OUT Date: 11/24/00          │
│                    OUT Time: 3:30 PM                    │
│                                                         │
│              Credit Card No.: VISA 123456789            │
│              Your account will be billed $25.00         │
│                                                       423│
│         ┌─────────────────────────────────────┐       │
│         │          Policy Statements          │       │
│         │  Cancellation, Changes and Extensions│       │
│         └─────────────────────────────────────┘       │
│                                                         │
│                    ( Confirm )  425                     │
│                                                         │
└─────────────────────────────────────────────────────────┘
```

METHOD AND SYSTEMS FOR SPACE RESERVATION ON PARKING LOTS WITH MECHANISMS FOR SPACE AUCTIONING, OVER-BOOKING, RESERVATION PERIOD EXTENSIONS, AND INCENTIVES

BACKGROUND OF THE INVENTION

1. Technical Field

The present invention is related to computer-related systems, methods and programs, and in particular, to a computer-controlled parking system. Still more particularly, the present invention relates to an Internet-based, computer-implemented parking reservation system.

2. Description of the Related Art

Internet-based, computer-implemented business methods are becoming increasingly popular in today's global business environment. One primary focus of these methods is the reduction of time required for the users/customers to complete these mundane tasks. Often, these methods target mundane tasks that were traditionally completed in a time consuming manner, but which lend themselves to a more efficient manner of operation with a standard computer system. One such mundane task, which has yet to be fully automated because of difficulties in implementation, is that of reserving parking spaces at high turn-over parking locations such as at airport terminals.

Parking in airport terminal parking facilities is a very inconvenient and timely procedure for busy travelers. Unlike a downtown business parking lot where a patron is able to contract for a parking space based on a set pattern of daily use, air travelers often do not know until a few weeks prior to their travel date that they are going to park their vehicles at the airport parking lot. Also, the air traveler rarely needs a parking space for longer than a few days at a time.

Often, because of time constraints, air travelers generally do not wish to spend a large amount of time looking for a spot in a parking lot. Presently, parking facilities typically provide open parking. In these open parking facilities, after the traveler enters the parking facility, the traveler expends significant amounts of effort and time searching for an available space from among the hundreds of possible spaces, many of which may be already occupied.

Another drawback in current parking systems is that the parking facility at airports typically get full very quickly during peak travel periods such as over the Thanksgiving and Christmas holidays. Thus, during these times the traveler may be unable to find an available space when he arrives at the airport.

Airport parking facilities are generally far away from the terminal buildings. Because of the remoteness of the location, the air traveler usually has to wait for and take a shuttle to get to the terminal. The air traveler thus has to off-load his/her bags, wait for the shuttle, load the bags onto the shuttle, then off-load the bags again at the terminal. The entire process can be rather time consuming and occasionally causes frustration in the air traveler.

In today's business environment, where travelers are generally business personnel who do not wish to spend a lot of time doing mundane tasks such as finding spaces for their vehicles upon arrival at the airport, parking their vehicles, etc., there is a need for a more efficient method of parking at high turn-over parking facilities. Some methods have been proposed to automate the parking process and make parking a more efficient process. Among these methods are: U.S. Pat. No. 5,877,704, Parking Site Reservation Control System; U.S. Pat. No. 5,091,727, Fully Optimized Automatic Parking Facility Management System; and U.S. Pat. No. 5,940,481, Parking Management System.

Each of these methods utilizes a computer-implemented reservation or control of the parking facility. However, each method has specific limitations, which makes the method unattractive to travelers who desired a more dependable and efficient solution. For example, U.S. Pat. No. 5,091,727 provides an automated parking facility management system whereby, only after the vehicle arrives at the entrance of the parking lot is the driver provided with a printout of any available space.

The above method proves problematic for air travelers because the air traveler does not wish to travel significant distances from home to the airport only to find out when he arrives at the airport that the parking facilities are all full. The inherent problems associated with learning of the non-availability of a parking space at that time are obvious. The air traveler may be forced to make alternative arrangements for parking, and in high travel periods, alternative parking may not be available at the airport. Locating additional parking even during a regular travel period may prove very difficult and time consuming.

At worst-case, the traveler may have to drive his vehicle back to his home and take a taxi or shuttle back to the airport and hope he has enough time left to make his flight. Because of these parking uncertainties, most travelers simply have someone give them a ride to the airport or take a taxi or shuttle to the airport.

Business travelers would prefer not to waste time waiting on a shuttle or taxi cab. Also, the cost of the shuttle or taxi cab can become rather expensive for regular travelers who do not have the extra money required to pay the high fees associated with both services, particularly when the airport is a significant distance away from the travelers origination point.

The present invention recognizes the need for a more efficient parking reservation system than provided by the above methods. The present invention also recognizes the need for a computer-implemented, automated system that also provides human services when necessary to enable the traveler to further eliminate time spent parking his vehicle at the airport terminal. These and other benefits are provided by the present invention.

SUMMARY OF THE INVENTION

Disclosed is a computer-driven reservation system for reserving spaces in a parking facility at an airport terminal. The reservation system comprises a central server, a database of locations and associated plurality of spaces, which may be reserved for customer use, and one or more customer terminals on which is displayed a graphical user interface (GUI) for receiving a customer's reservation request and enabling other customer interactions. The central server, database and customer terminals are interlinked via a wide-area network such as the Internet.

The central server includes a reservation utility that determines whether a space is available. Reservation utility provides a reservation GUI and a printable reservation coupon with reservation information when a space is reserved. Central server also provides various other utilities to enable reservation of a parking space from a remote customer terminal prior to the date on which the parking space is required.

In one embodiment, the central server comprises an auction utility that monitors the number of spaces available in a particular location and in response to the number falling below a predetermined number, implements an on-line auction procedure for all of the remaining number of spaces. Each remaining space is then allocated to a highest bidder.

The central server also includes a billing or payment authorization utility. The billing utility allows the customer to be billed for the reservation requests via a credit card or other electronic method. In a preferred embodiment, billing of the customer is handled by an external billing center of a credit card company or other financial institution.

During placing of the reservation request, the customer enters customer information including name, address, etc., as well as billing information such as a credit card number and an expiration date. The customer also enters reservation request information including date and time of departure and date and time of arrival. With the entered information, the central server generates a customer reservation coupon on which a bar code is provided for display by the customer when entering the parking location. When the customer is ready to utilize the reservation, the customer displays the reservation coupon on the windshield or other visible area of his vehicle while driving into the parking facility. A scanner located at the entrance of the parking facility reads the bar code and registers the entry of the vehicle with the central server, which updates the database. When the vehicle leaves the parking lot, the bar code is again scanned and forwarded to the central server. The central server updates the database when reservations are made and canceled and as vehicles enter and exit the locations. Thus, the available spaces in the lot are constantly monitored and updated within the database.

In another embodiment of the invention, an extension of time utility or mechanism is implemented whereby the customer may access the central server via a customer terminal or call-in number with automated selections and request that a reservation which was previously made be changed (i.e., extended).

In the preferred embodiment, connection by the customer terminal to the central server is completed via a Universal Resource Locator (URL) of the central server's web site and the customer accesses the central server via the Internet.

In yet another embodiment, the central server includes a travel period monitoring utility which determines when peak period of travel occurs. During peak periods, the cost of available spaces are increased because of the increased demands. One related embodiment of the invention provides incentives for over-booking of spaces during peak periods. Another related embodiment implements the auction utility during peak periods.

The above as well as additional objects, features, and advantages of the present invention will become apparent in the following detailed written description.

BRIEF DESCRIPTION OF THE DRAWINGS

The novel features believed characterics of the invention are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DETAILED DESCRIPTION OF THE PREFERRED EMBODIMENT

Figure 1:
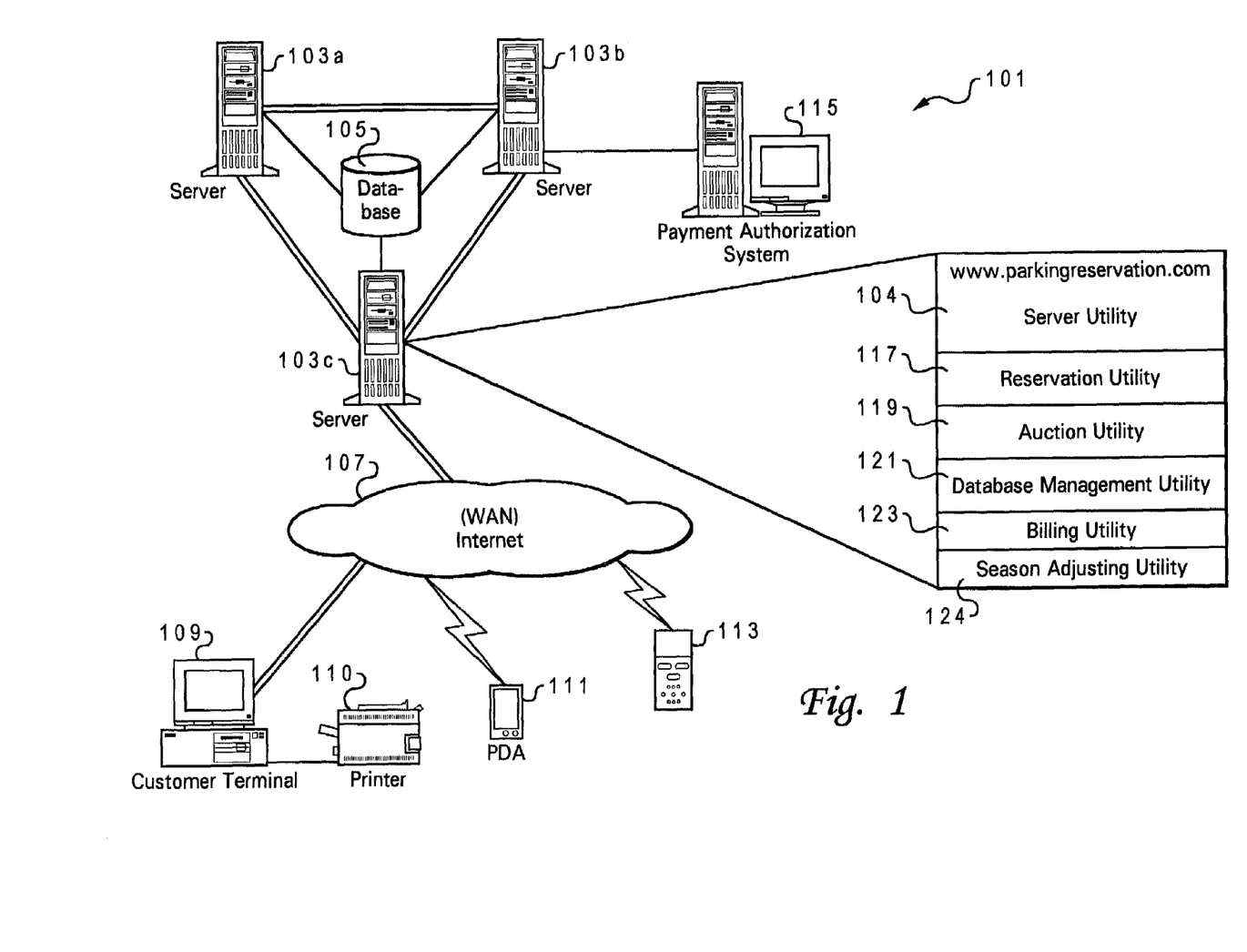
FIG. 1 illustrates a space reservation system or network with a central server (or central management system) according to a preferred embodiment of the invention.

With reference now with the figures, and in particular with reference with FIG. 1, there is illustrated a reservation system according to one embodiment of the invention. Reservation system 100 includes a central server 101 which may comprise a plurality of servers 103a–103c and a shared database 105. Reservation system 100 also includes customer terminal 109 to which is connected printer 110 and may also include other customer access devices such as personal digital assistant (PDA) 111 and cellular telephone 113. Customer terminal 109, PDA 111, and cellular telephone 113 connect to central server 101 via a wide area network such as the Internet 107. Connection to the Internet 107 may be via a wired connection or via wireless connection as is illustrated for PDA 111 and cellular telephone 113.

Included within each server 103a–103c are several functional components including customer reservation utility 117, auctioning utility 119, database management utility 121, and billing/payment utility 123. In one embodiment, servers 103a–103c also include a season adjusting utility 124 that dynamically increases an amount of payment for reserved spaces during a high reservation period as will be described below.

Servers 103a–103c are accessed via a Universal Resource Locator (URL) 104 and have an associated web site, for example, the website "parkingreservation.com." During implementation of the invention, a customer interacts with central server 101 via a graphical user interface (GUI), which is displayed on the customer terminal 109 linked to the web site identified by the URL 104 of the central server 101. The customer enters a reservation request for a particular parking facility. The central server 101 receives the request, accesses the database 105 to determine if there are available spaces, reserves a space if available, and provides the customer with an output indicating whether a space has been reserved.

Reservation system 100 also provides a payment authorization mechanism 115, which may not be a part of the reservation system 100, but is interlinked to central server 101 to allow billing and/or payment for reservations made during implementation of the invention. Payment authorization mechanism 115 may be provided by a credit card company or other financial institution that authorizes electronic payments.

Reservation system 100 may provide access to a wide geographical area including multiple facilities (or location), which may be delineated by geographic or other identifying information. Thus, servers 103a–103c, though interconnected, may be geographically remote from each other. Also, although illustrated with a plurality of servers 103a–103c, reservation system 100 may comprise a single server. Utilization of a plurality of servers 103a–103c, which are geographically dispersed enables easier distribution of on-line traffic and reduces congestion on the connecting lines to a particular server. Central server 101 is preferably a data processing system.

The preferred embodiment is described with specific reference to a parking facility and in particular to a parking facility at an airport. The described embodiment further assumes the customers to be airline passengers who desired to park their vehicles at the parking facility. Specific references to a parking facility and/or airports and air travelers are not intended to be limiting on the invention.

Figure 3A:
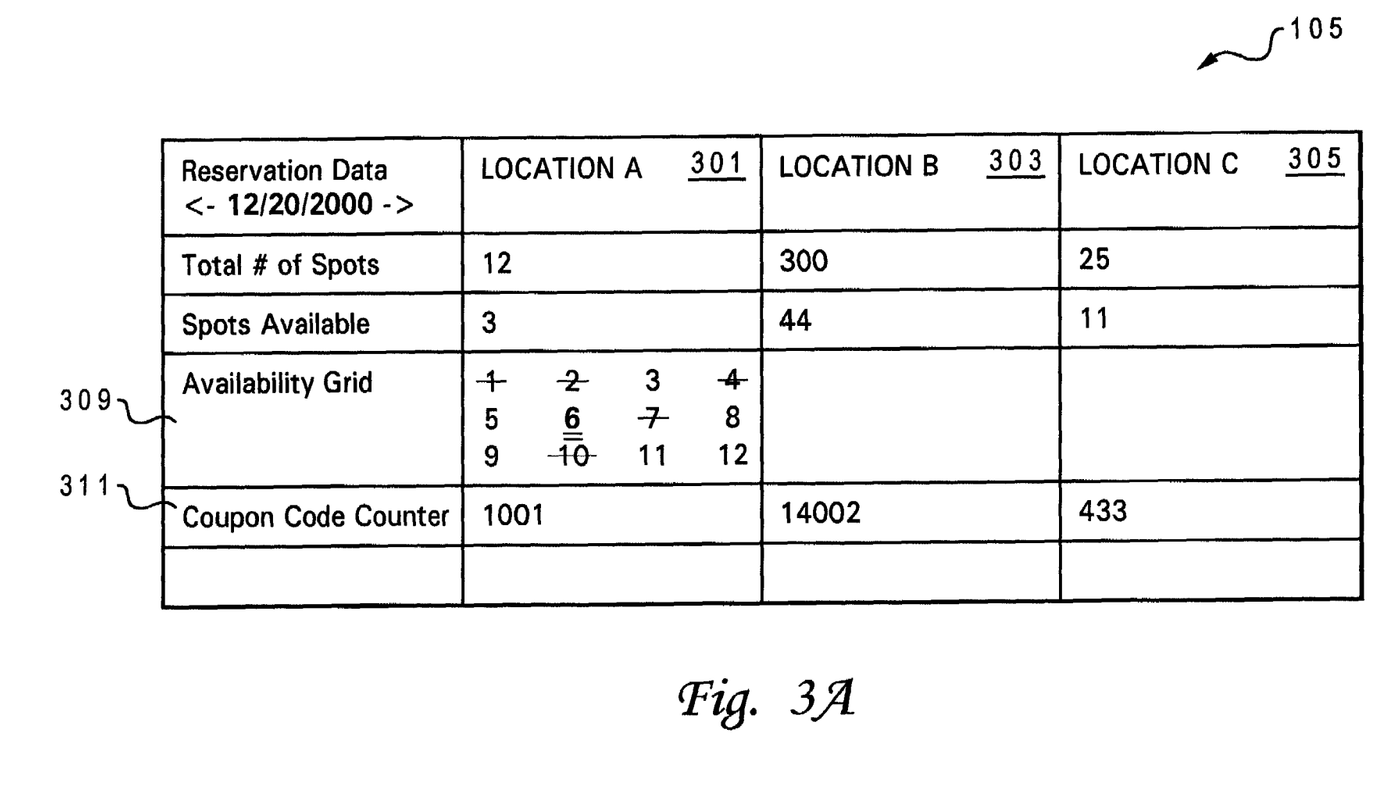
FIGS. 3A and 3B provide representations of information included within a sample database of parking reservation system according to one embodiment of the invention.
Figure 3B:
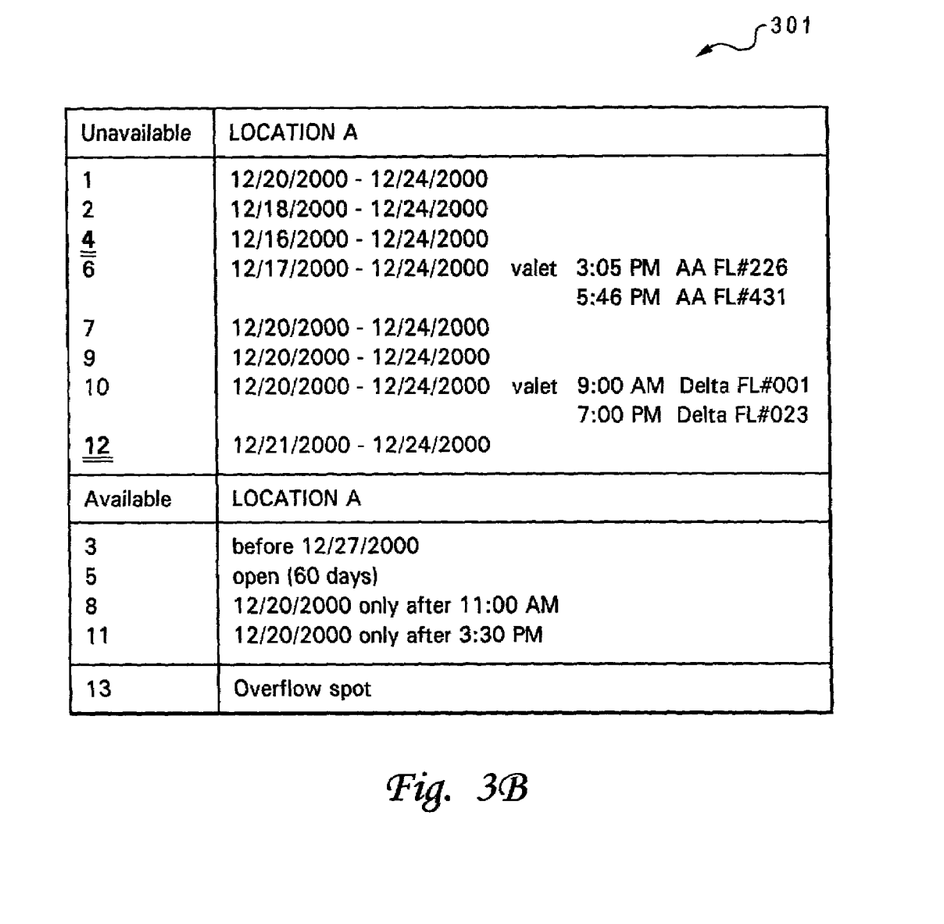

FIGS. 3A and 3B illustrate information included in a sample database 105, which provides a calendar day profile of space use and availability for three locations. During one implementation, the regular pre-booking period for reservations is 60 days, and thus database 105 may include information for up to 60 days of reservation information. A customer who wishes to reserve a space beyond a 60-day time frame, i.e., more than 60 days prior to the desired reservation date, may be charged a one-time extra fee for the earlier-placed reservation. Database 105 is updated by central server 101 on a continuous basis to track the availability of spaces at each location.

Reservation of a parking space may be completed within a certain time frame prior to the actual departure date of the customer. Thus, in one embodiment, a customer may enter a request 60 days prior to the departure date and as little as 6 hours prior to the departure time.

As illustrated in FIG. 3A, a high level view of database 105 provides information related to the number of spaces in a particular location. A coupon code count 311 is also maintained in database 105 and utilized to track reservations as will be discussed later. Three locations, location A 301, location B 303, and location C 305 are illustrated. Space allocation and reservation in location A 301 in particular are discussed herein. Twelve (12) possible spaces are illustrated in availability grid 309 for location A 301. Of the 12 spaces, several, i.e., 1, 2, 4, 7, and 10 are unavailable on the requested date (Dec. 20, 2000). The other spaces at location A 301 have various levels of availability depending on previous reservations and the requested period for the present reservation. For example, as further illustrated in FIG. 3B, space 5 is completely available for new reservations, whereas space 11 is only available after 3:30 p.m. on Dec. 20, 2000, and space 8 is only available from 11:00 a.m. Space 12 appears to be open on Dec. 20, 2000 but is already reserved for the following day. Therefore, a reservation request for longer than 1 day cannot be made in space 12.

Figure 4A:
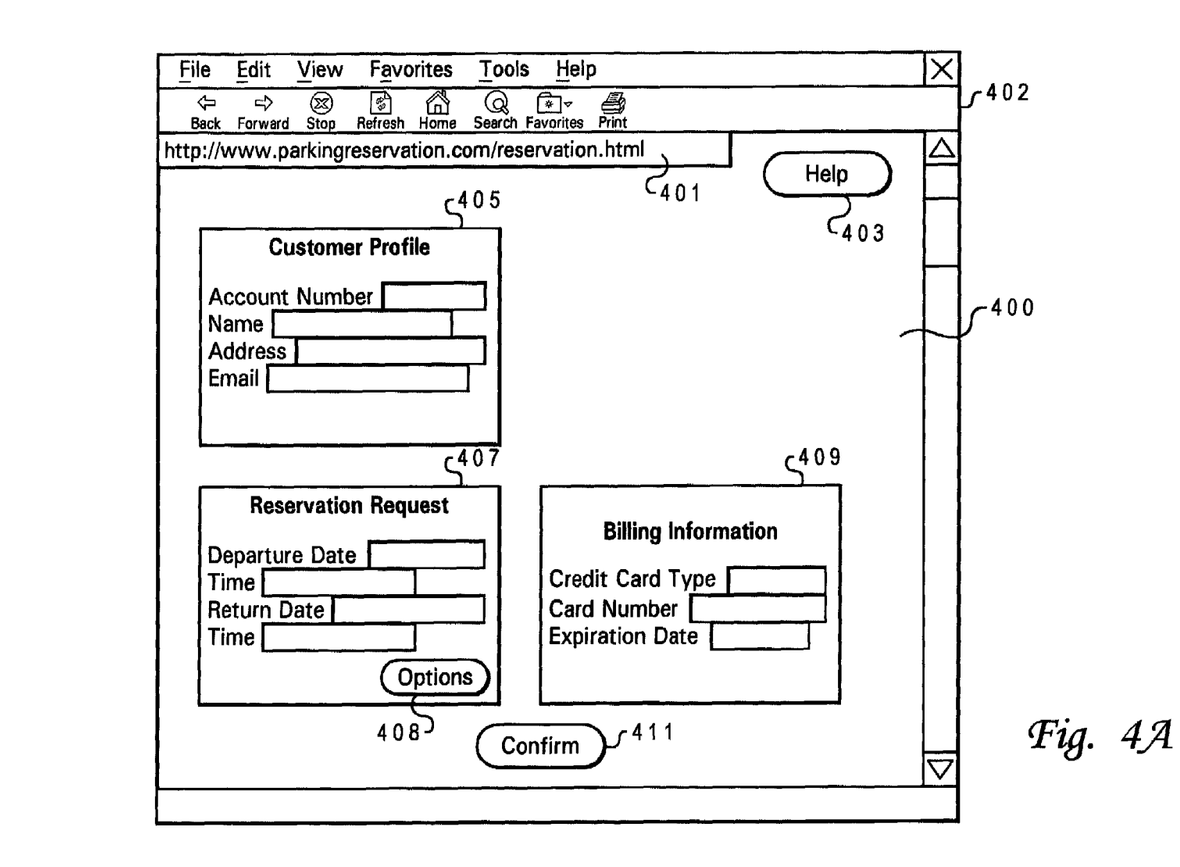
FIG. 4A illustrates a reservation Graphical User Interface (GUI) with which a customer's reservation request is entered in accordance with a preferred embodiment of the invention.

Referring now to FIG. 4A, there is illustrated a customer reservation GUI 400 in which a customer enters a reservation request. Customer reservation GUI 400 is illustrated within a web browser 402 and is accessed via URL 401 entered by the customer in the search or URL area of web browser 402. Customer reservation GUI 400 includes three major sections. Personal information section 405 allows a customer to enter his name, address, and other personal information. Billing information section 409 allows the customer to enter billing information such as a credit card number and expiration date or other form of billing. Reservation period section 407 allows the customer to select dates and times to begin and end the reservation, respectively.

In one embodiment, an account number, which is previously assigned, may be entered by the customer. Account numbers are available when a customer signs up with the central server 101 during an initial transaction. Entry of the account number identifies the particular customer and allows the customer to by-pass the personal information section 405 and billing information section 409. Customers who make frequent reservations save time by signing up for an account number. In one embodiment, customers with account numbers are provided with rebates or special pricing.

In one embodiment, the reservation information includes the departure date and time and the arrival date and time of an airline flight and the server extrapolates to provide an actual reservation start and end time. The entered reservation information may also include flight information such as the flight number and carrier.

Figure 4B:
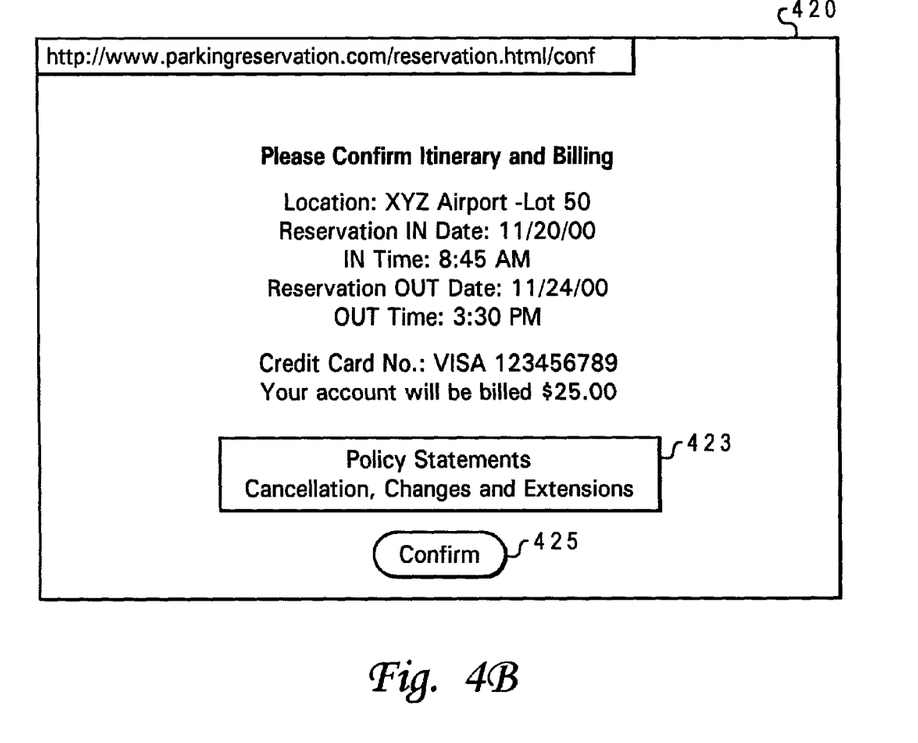
FIG. 4B illustrates a confirmation GUI in accordance with one embodiment of the invention.
Figure 4C:
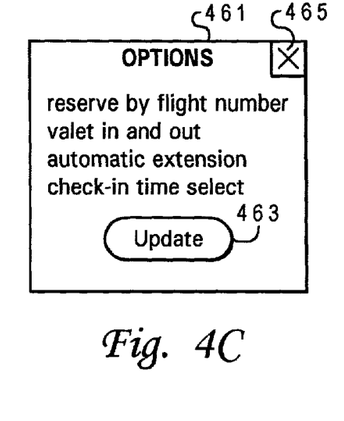
FIGS. 4C and 4D illustrate a help GUI and an options GUI utilized in accordance with one embodiment of the invention.
Figure 4D:
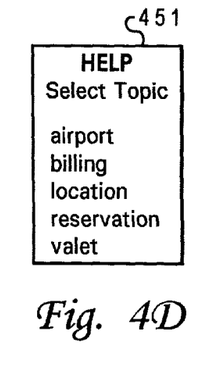

Also included in customer reservation GUI 400 is help button 403 that opens help GUI 451 of FIG. 4D, which provides a customer with additional information about the various sections and/or options of the customer reservation GUI 400.

Customer reservation GUI 400 also includes option button 408, which allows the user to select additional options from within options GUI 461 of FIG. 4C. The options provided include longer parking periods, shorter parking periods, specific time and date selections, specific lots and valet services. Several of these options are explained below. When the customer has completed his selection of options, the customer may either apply the options to his reservation via the update button 463, or exit without applying the options by depressing close window item 465.

Returning to FIG. 4A, once the customer has completed the interactions with customer reservation GUI 400, and confirm button 411 is selected, confirmation GUI 420 of FIG. 4B opens on customer terminal 109. Confirmation GUI 420 includes confirmation information such as the arrival and departure information, the actual time prior to arrival when the customer may enter into the facility and a time following his arrival when his vehicle is expected to be removed from the facility before additional charges are incurred.

Confirmation GUI 420 also provides the customer with boilerplate policy statements 423 regarding cancellations, changes, etc. Also provided is relevant information about pricing, billing, and billing methods and information for changing the reservation. If all of the information is correct, the customer may select confirm button 425.

Figure 4E:
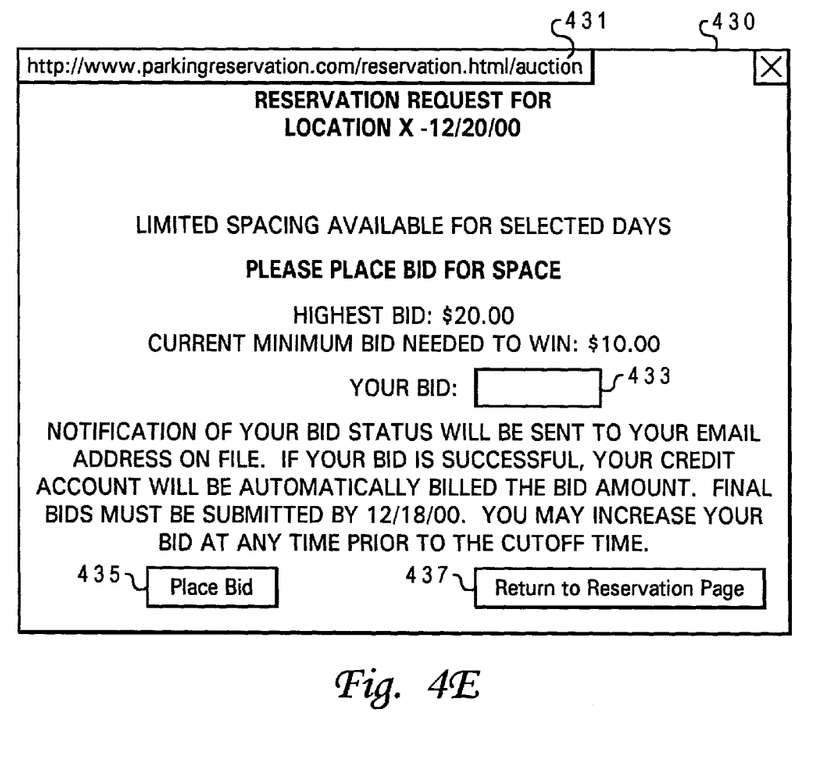
FIG. 4E illustrates an auction utility GUI in accordance with a preferred embodiment of the invention.

FIG. 4E illustrates another embodiment of the invention in which reservation is completed via an auctioning method. Whenever the customer places a reservation request via customer reservation GUI 400, central server 101 evaluates the availability of spaces at the particular location selected for the time period selected. When the location is above a certain threshold, i.e., when more than a predetermined percentage of the available spaces are full, central server 101 activates an auctioning utility 119 that provides a link via auction URL 431, which displays auction GUI 430 on the customer terminal 109. Auction GUI 430 provides information to the customer about the number of available spaces and the bid price needed to win one of the available spaces and a bid location 433 in which the customer may enter a bid amount. After entering a bid amount, the customer may select place bid button 435 to submit his bid. Alternatively, the customer may decide not to bid and return to the reservation page by selecting return button 437.

Auctioning utility 119 also provides email notification by which a customer is notified whenever he has been out-bided by other customers (i.e., the customer bid is no longer one of the high bids taking into consideration the actual number of spaces available). The customer may then choose to re-open the auction GUI 431 and place another bid for a space reservation.

In a preferred embodiment, the bidding process for the spaces is closed 24 hours prior to the date on which the space is requested. That way, a customer knows within 24 hours prior to his departure whether or not he actually has a reserved space at the parking facility.

Figure 5A:
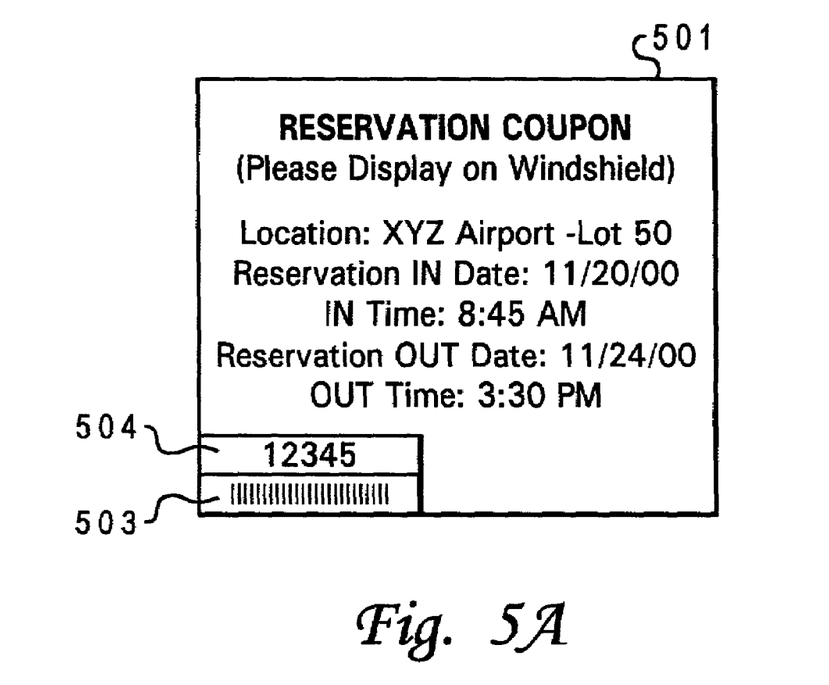
FIGS. 5A and 5B illustrate a computer reservation coupon including a bar code and sample bar code information, respectively, in accordance with the preferred embodiment of the invention.

FIG. 5A illustrates a reservation coupon produced by the reservation process described above. Reservation coupon 501 is preferably printed on printer 110 connected to customer terminal 109. Alternatively, reservation coupon 501 may be mailed to the customer from central server 101. For example, a customer making his reservation with a cellular phone 113 may request the coupon be mailed to him.

Reservation coupon 501 preferably includes bar code 503 and coupon count 504, which uniquely identifies reservation coupon 501 and allows the parking facility to monitor the coming and going of the vehicle in which coupon 501 is placed. Coupon 501 may also include additional information such as disclaimers, comments regarding overstaying in the lot, and telephone number or web sites to contact reservation personnel in the event of cancellation or changes (e.g., extension of the reservation period) once the reservation has been completed.

Figure 5B:
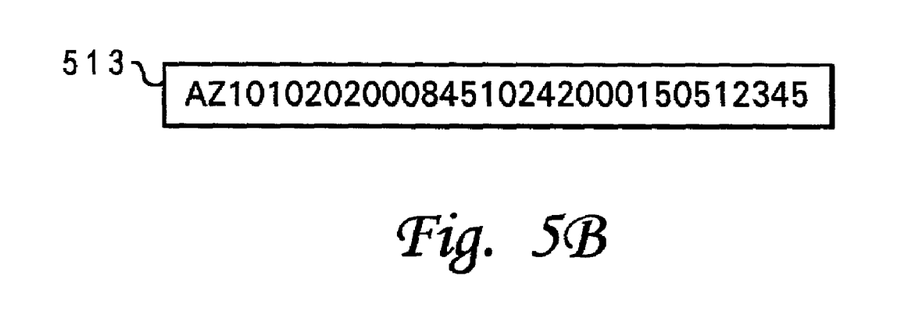

FIG. 5B illustrates sample information which may be included or encoded in bar code 503. A block of information 513 is provided that may include the location information, the actual space at that location, the departure date, the departure time, and arrival date and arrival time. Bar code 513 may also include other information such as coupon count 504 to uniquely identify the reservation coupon 501.

Figure 2:
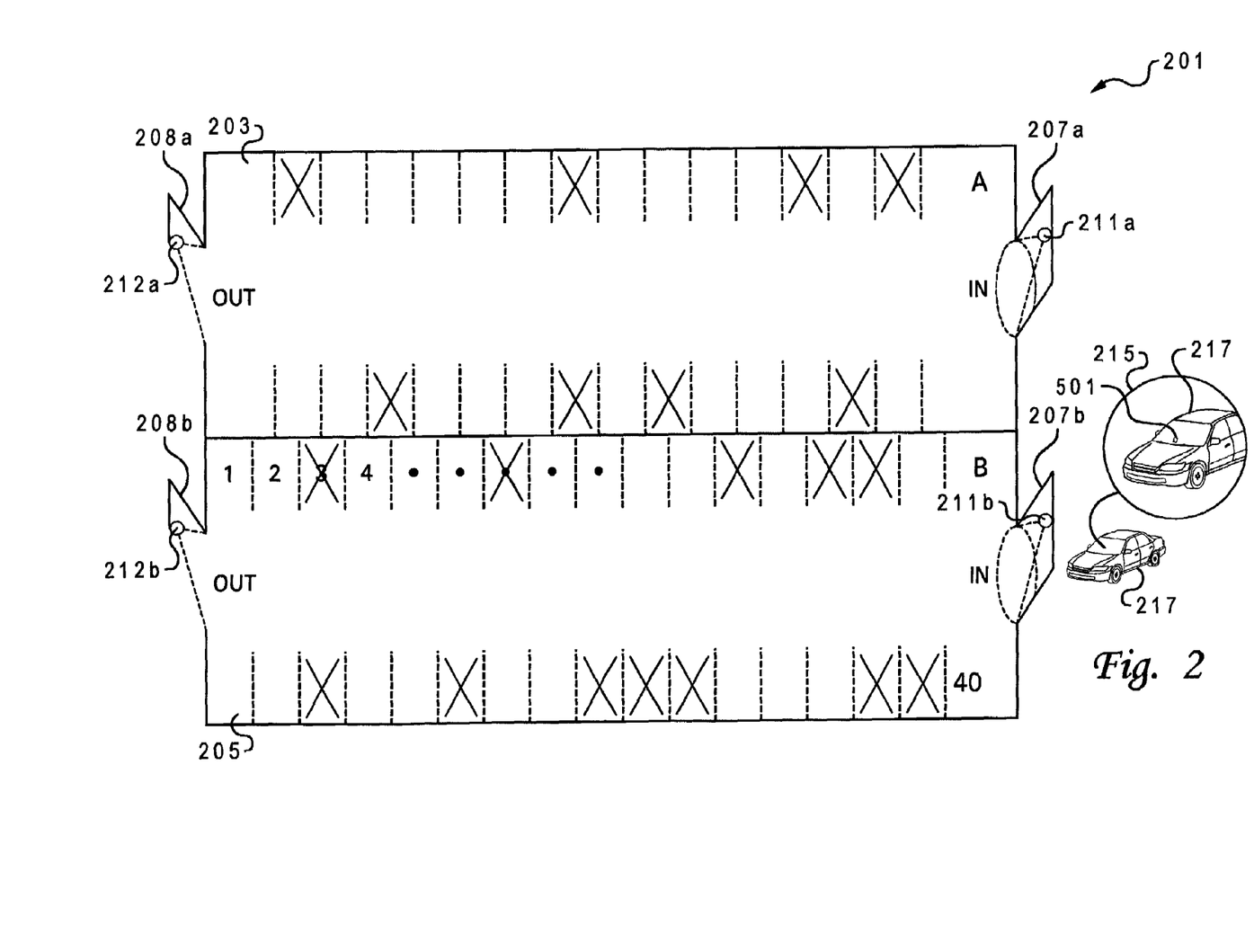
FIG. 2 provides a schematic of a parking lot with various spaces and entry/exit scanners utilized in a preferred embodiment of the invention.

Referring now to FIG. 2, there is illustrated a representative parking facility according to one embodiment of the invention. Parking facility 201 includes two separated parking areas, parking area A 203 and parking area B 205. Parking area A 203 is an open parking area, i.e., vehicles entering this area can park in any available spot. Parking area B 205 is a reserved parking area, and vehicles may only park in a particular space that has been reserved by the customer. Both parking area A 203 and parking area B 205 have an "in" gate and an "out" gate. The in gates 207a and 207b and out gates 208a and 208b are equipped with scanners 211a, 211b and 212a, 212b, respectively, by which the bar code on the reservation coupon 501 may be read as the vehicle enters and exits the parking facility 201.

As illustrated in the insert 215, a coupon 501 is placed in a visible location on the windshield of a vehicle 217 entering parking area B 205. Scanners 211a, 211b and 212a, 212b are connected to central server 101 and provide a monitoring function by which database 105 is updated by servers 103a–103c. Use of scanners 211a, 211b and 212a, 212b allows for a fully automated implementation of the present invention as will be described below.

Figure 6:
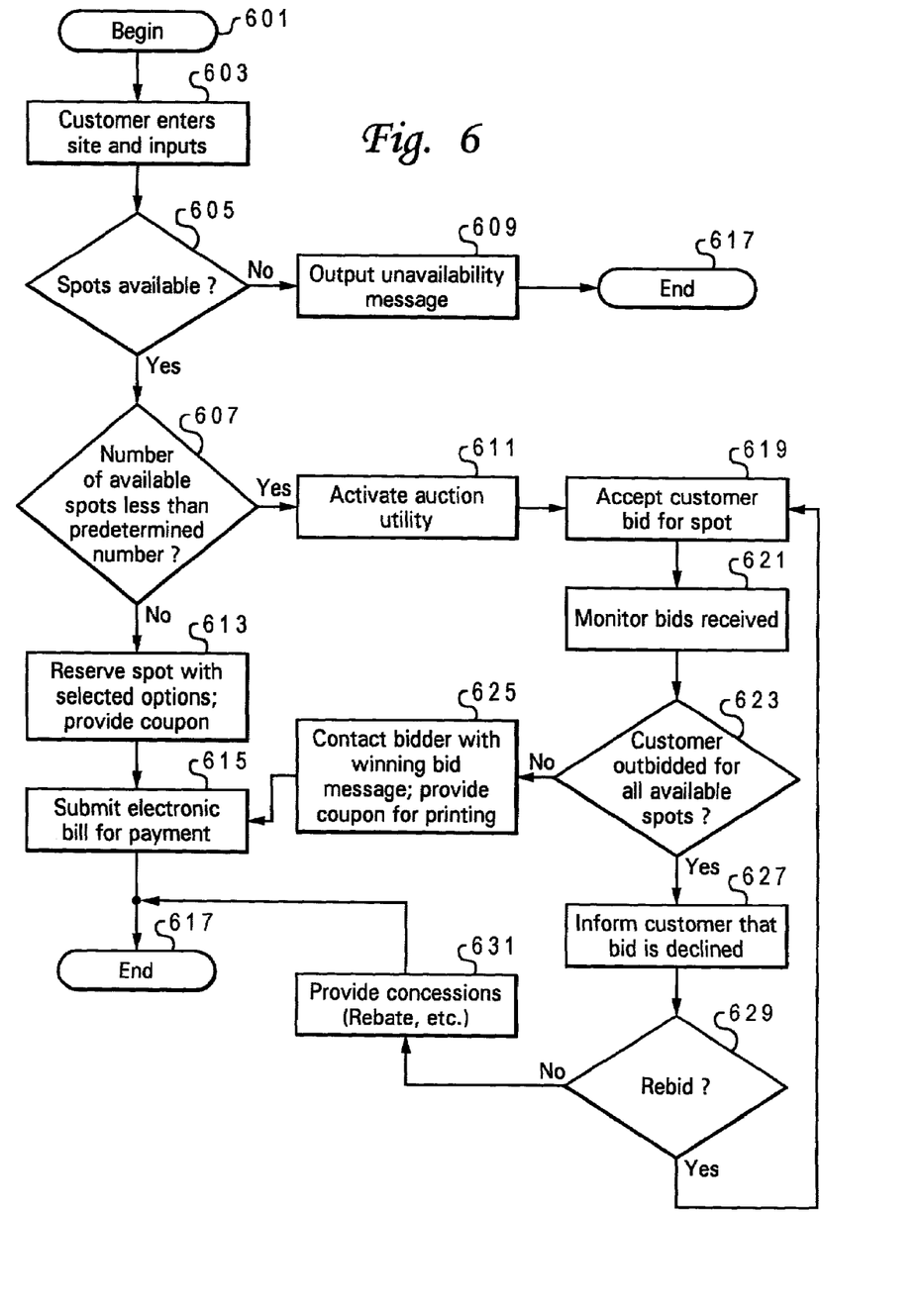
FIG. 6 provides a flowchart of logic for reserving and billing of a parking spot in accordance with a preferred embodiment of the invention.

FIG. 6 provides a flowchart of the process of reserving a parking space in accordance with the present invention. The process begins at block 601 and then proceeds to block 603, where a customer opens the parkingreservation.com web site and enters a reservation request. A determination is made at block 605 whether a space is available at the particular location. If no space is available, then a message is sent to the customer indicating the unavailability of spaces at block 609, and then the process ends at block 617.

If there is a space available, a check is made at block 607 whether the number of spaces remaining is below a particular number, i.e., whether the facility is above a predetermined number (or percentage) full. If the number of available spaces is greater than the predetermined number that triggers an auction utility, a space is reserved at block 613 with the customer's selected options. An electronic bill is submitted to the payment authorization system 115 for payment at block 615. Then, the process ends at block 617.

Returning now to block 607, if the facility is greater than the predetermined percentage full, then an auctioning utility 119 is activated at block 611. The predetermined percentage may range from 0 to 100 percent, i.e., all auction or no auction. The customer is prompted for a bid at block 619. The central server 101 monitors the bids received at block 621 and keeps the highest bid for each space. A determination is later made at block 623 whether a customer has been outbidded for all the available spaces.

If the customer has not been outbidded, then the customer is contacted 24 hours prior to the start date/time of the reservation at block 625 and provided with a reservation coupon with which he may enter the parking facility at the airport.

If, however, the customer has been outbidded, then the customer is contacted by email at block 627. The customer may then exercise the options of rebidding or finding an alternate means of parking or making other transportation arrangements to the airport.

A determination is made at block 629 whether the customer wishes to rebid. If the customer wishes to rebid, the process returns to block 619 where the new customer bid is accepted. If the customer decides not to rebid, the customer is provided with a concession at block 631 such as a discount for his next reservation, a monetary rebate, or some sort of gift.

In one embodiment, a contingency for over-booking is provided. Because of cancellations or changes after a reservation has been registered, the central server 101 is provided with an emergency contingency for an overbooked facility. As illustrated in FIG. 3, location A 301 of database 105 actually includes a numbered space 13, which is not assigned during normal reservation. A customer usually will not know of the overbooking until he arrives at the parking location and finds another vehicle in the reserved space or no open space in an open-parking reserved lot. Thus, by providing an extra space that is allocated only during overbooking, the customer is not forced to leave the facility and seek alternative parking.

When overbooking cannot be fully alleviated by providing additional spaces, other measures are implemented including providing a valet parking for the customer's vehicle, directing the customer to alternate parking facilities, etc. Additionally, the customer may be provided with other incentives, such as a complimentary parking for the next reservation made or a cash-back allowance, etc. Such policies would be mentioned in the contract boilerplate that is displayed to the client before he presses the "confirm" button 411.

Figure 7:
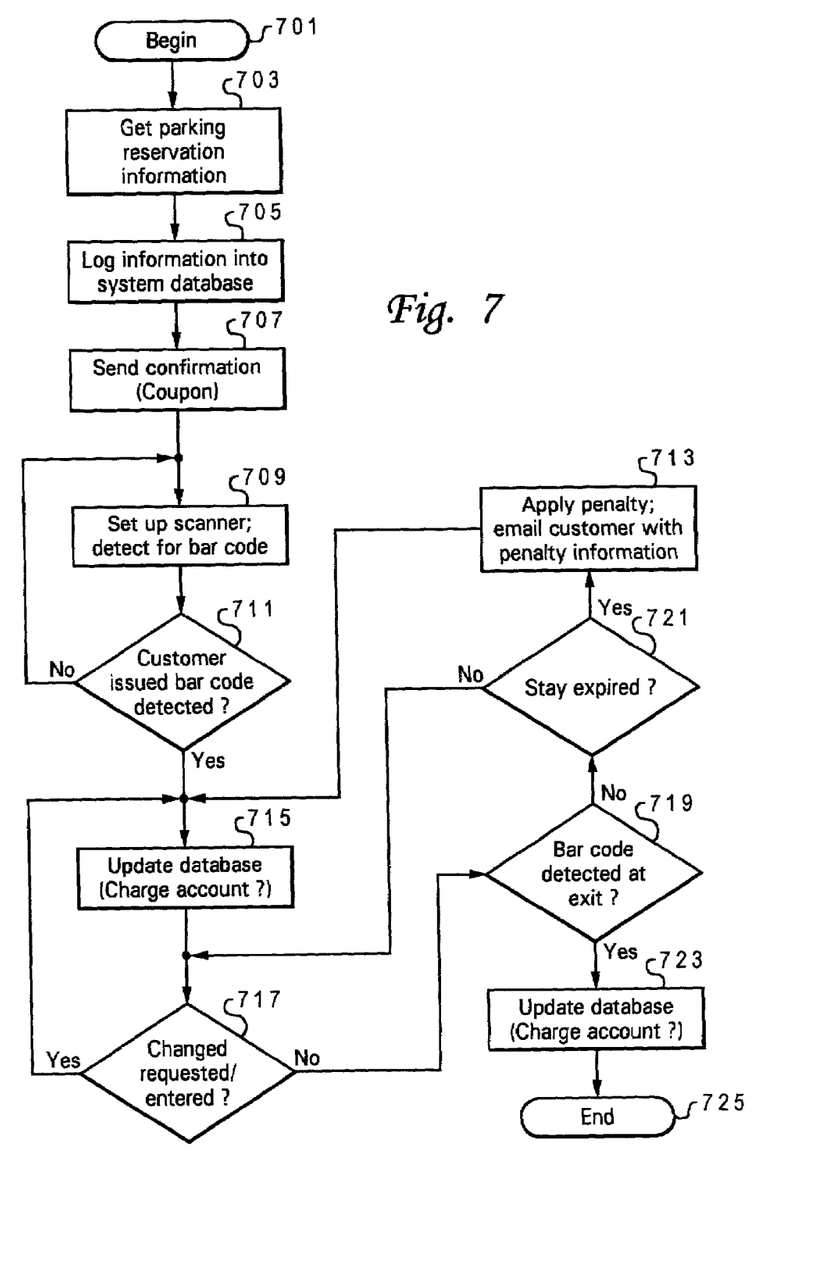
FIG. 7 provides a flowchart of the implementation logic of a parking facility monitoring system in accordance with a preferred embodiment of the invention.

FIG. 7 illustrates the monitoring process at the parking facility and associated updating of database 105 update. The process begins at block 701 and then proceeds to block 703 where the parking reservation request is received. The reservation information is logged into the database 105 at block 705 and a confirmation is sent to the customer at block 707.

Scanners are set up to detect when a vehicle comes into the parking facility at block 709. The unique customer barcode is detected and a determination is made at block 711 whether the barcode is a valid code (i.e., not an expired/outdated barcode).

If the barcode is not a valid code, the vehicle is denied entrance for reservation-only parking facilities, and the scanners continue to detect for valid barcodes. In one embodiment, entry to the parking facility is available to cash paying customers in addition to the reserved customers. The server 101 also tracks the number of cars without barcodes and utilizes the total number in allocating spaces. A parking facility would thus be closed to non-reserved vehicles when reserved vehicles are expected to fill the available spots.

Returning to block 711, if a valid code is detected, the central server 101 updates the database 105 at block 715 with the information regarding the unavailability of the particular space allocated to the customer. Afterwards, a determination is made at block 717 whether a change is made to the reservation after the vehicle has entered the parking facility. If a request for change is received, the central server 101 updates the database 105 at block 715, and the customer is charged for the change, accordingly.

The scanners at the exit monitor for the detection of the barcode at block 719. Thus, when the vehicle exits the parking lot, the barcode is detected by scanner 212a or 212b. A determination is made at block 721 whether the vehicle stayed beyond the reservation period, i.e., the barcode has expired. If the barcode has expired, a penalty is applied and the customer is billed the additional fee at block 713. The penalty may be an incremental penalty based on the number of days which the user has stayed beyond the reservation period.

Once the vehicle has left the parking lot, the reservation is removed from the system at block 723, and the particular space is then placed in the pool of available spaces that may be reserved by another user. The process then ends at block 725. In one embodiment, a reservation is purged from the system if the customer does not enter the parking facility by a predetermined time after the start of the reserved period. Also, information concerning the expiration of the barcode and applied penalty is emailed to the customer to prevent later surprise when the credit card bill is received by the customer.

One embodiment utilizes a valet service and other measures requiring reservation personnel in order to provide better service to the customer. A customer who selects the valet option in option GUI 461 is provided with a valet at the airport terminal who takes the vehicle from the customer and moves the vehicle to the parking facility reserved by that customer. Providing a valet service allows the customer the luxury of disembarking from his vehicle in front of the terminal. The customer thus does not have to be as concerned with the remoteness of the terminal or handling his bags, etc., because he is already at the terminal. When the customer returns from his trip, the valet service also provides the vehicle outside the airport terminal for the customer to pick up. Use of the valet service requires careful monitoring of changes in flight times (i.e., arrival and departure times). Delays in flight arrival and subsequent delay in the arriving customer are taken into account when determining when to provide the vehicle to the customer on his return. In one embodiment, the customer is able to call the valet service from a customer phone located within the terminal.

Monitoring of the vehicles within the facility may be completed by an attendant. The attendant is provided with a hand-held scanner and scans particular barcodes which appear to have expired. A color-coding scheme for reservation coupons may assist the attendant in identifying which coupons should be scanned. An even more accurate monitoring of the available spaces for a particular location may thus be implemented. Implementation of the automated embodiment is preferred.

The present invention lends itself to being linked to related reservation systems such as an on-line airline reservation system. Within the airline reservation system, parking reservation may be provided as an option to the airline traveler. Selecting the parking option links the airline reservation system to the central server 101 which opens up customer reservation GUI 400 for receipt of the airline traveler's parking reservation request. Once the parking reservation is completed and the coupon provided to the customer, the customer is returned to the airline reservation page from which the parking option was selected. Separate billing of customer accounts may be provided; however, with an integrated, full service airline travel reservation site, a single billing may be provided that includes the charges for both the airline reservation and the parking reservation.

It is important to note that while the present invention has been described in the context of a fully functional data processing system, those skilled in the art will appreciate that certain elements of the method of the present invention are capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD10 ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention. For example, the preferred embodiments are described with reference to reserving parking spaces in parking facility utilized by air travelers at an airport. However, the invention is fully applicable to other types of reservation systems for other types of facilities and customers. Also, although the invention is described with specific reference to a reserved-space parking facility, the invention is also fully applicable to an open-space parking facility where the customer is not assigned to a particular space, but merely is provided access to any available space in the parking facility.

What is claimed is:

1. A method of reserving a space from among a plurality of spaces at a location, said method comprising the steps of:

receiving a reservation request inputted into a graphical user interface of a reservation system utilized to provide reservations for one of the plurality of spaces at said location, said reservation request including date and time information for which said reservation is made;

providing an electronic payment method for receiving payment for an issued reservation corresponding to said reservation request;

outputting, in response to the receipt of payment, a reservation coupon, which includes an identifying bar code that enables access to the location via a bar code reader, and wherein when the reservation assigns a particular space among the plurality of spaces, the reservation coupon also includes a space identifier indicating the particular space that is assigned to the reservation; and updating a reservation period linked to the reservation coupon by an additional period on payment by the customer for the additional period, wherein the customer is able to extend a reservation after said reservation coupon has been printed when the reserved space had not been allocated to another customer.

2. A method of reserving a space from among a plurality of spaces at a location, said method comprising the steps of:

receiving a reservation request inputted into a graphical user interface of a reservation system utilized to provide reservations for one of the plurality of spaces at said location, said reservation request including date and time information for which said reservation is made;

providing an electronic payment method for receiving payment for an issued reservation corresponding to said reservation request;

outputting, in response to the receipt of payment, a reservation coupon, which includes an identifying bar code that enables access to the location via a bar code reader, and wherein when the reservation assigns a particular space among the plurality of spaces, the reservation coupon also includes a space identifier indicating the particular space that is assigned to the reservation;

instructing a recipient of the reservation coupon to visibly display said reservation coupon to allow said identifying bar code to be read when said reservation coupon is used while passing through an entrance and an exit of said location; and tracking use of the space and remaining available spaces within the location by monitoring which reservation coupons are presented at the entrance and exit of the location.

3. The method of claim 1, wherein when only a predetermined percentage of spaces are available at said location, said providing step includes the step of:

activating an auction utility to enable multiple users to start bidding for one of said spaces, wherein a user with a highest bid is awarded the space and issued a corresponding reservation coupon.

4. A method of reserving a space from among a plurality of spaces at a location, said method comprising the steps of:

receiving a reservation request inputted into a graphical user interface of a reservation system utilized to provide reservations for one of the plurality of spaces at said location, said reservation request including date and time information for which said reservation is made;

providing an electronic payment method for receiving payment for an issued reservation corresponding to said reservation request;

outputting, in response to the receipt of payment, a reservation coupon, which includes an identifying bar code that enables access to the location via a bar code reader, and wherein when the reservation assigns a particular space among the plurality of spaces, the reservation coupon also includes a space identifier indicating the particular space that is assigned to the reservation;

receiving a request to extend said reservation period from the recipient of the reservation coupon;

extending said reservation period when there space has not been previously issued to another recipient, wherein said extending occurs after said reservation coupon has been issued and said extending is updated within the reservation system to apply to the previously issued reservation coupon; and requesting an electronic payment for an extension to a reservation acquired by said extending step, wherein said electronic payment is received prior to said reservation period being extended when there is no monitoring of the location to collect payment for the additional reservation.

5. The method of claim 1, wherein said space is a parking space, and said method further comprises the step of selecting a valet option with said reservation request, wherein a valet receives the recipient's vehicle at a predetermined valet location and parks the recipient's vehicle within the location at the beginning of the reservation period and the valet retrieves and delivers the recipient's vehicle at an end of said reservation period.

6. The method of claim 1, further comprising the steps of:
enabling connection of a customer terminal to a reservation web site via the Internet; and
enabling a customer interaction via said graphical user interface (GUI) to transact said reservation request.

7. The method of claim 1, further comprising the step of setting up a customer account with personal and payment information to reduce customer interface time with said GUI when making a subsequent reservation request.

8. A space reservation computer system comprising:
a database of locations that each provide a plurality of spaces that may be reserved;
a graphical user interface that receives a customer's request for a space at one of said locations;
an availability utility that determines whether said space is available;
electronic payment mechanism for receiving electronic payment to reserve the space for the customer;
output means for, in response to said space being available, providing said customer with a printable reservation coupon containing information by which access to said location is controlled, wherein when the reservation assigns a particular space among the plurality of spaces, the reservation coupon also includes a space identifier indicating the particular space that is assigned to the reservation; and
an extension utility that allows said customer to extend a reservation after said reservation coupon has been printed when the reserved space had not been allocated to another customer, wherein the extension utility updates the reservation period linked to the coupon code by an additional period upon payment by the customer for the additional period.

9. The computer system of claim 8, further comprising a customer terminal on which said GUI is displayed.

10. The computer system of claim 8, further comprising an auctioning utility that:
monitors a number of spaces available at each of said locations; and
in response to a reservation request at a location that has less than a predetermine number of spaces available, activates an auction for each of said number of spaces available, wherein each space is reserved to a highest bidder.

11. A space reservation computer system comprising:
a database of locations that each provide a plurality of spaces that may be reserved;
a graphical user interface that receives a customer's request for a space at one of said locations;
an availability utility that determines whether said space is available;
electronic payment mechanism for receiving electronic payment to reserve the space for the customer;
output means for, in response to said space being available, providing said customer with a printable reservation coupon containing information by which access to said location is controlled, wherein when the reservation assigns a particular space among the plurality of spaces, the reservation coupon also includes a space identifier indicating the particular space that is assigned to the reservation;
a server on which said GUI and said availability utility are executed, wherein said server is coupled to said database of locations and periodically updates said database of location based on current use of the reserved spaces and current availability of spaces previously reserved;
a location monitoring mechanism linked to said server and which monitors an entrance and exit of said location to determine when said space is utilized and provides feedback of a utilization of said space to said server; and
wherein said reservation coupon includes a bar code readable by a remote bar code scanner, wherein further said location monitoring mechanism includes said remote bar code scanner and monitors an entry into and exit from said location by requiring the customer scan said reservation coupon at the entrance and exit of the location.

12. The computer system of claim 11, wherein said server automatically updates said database of locations in response to both an acceptance of a reservation request and said utilization.

13. The computer system of claim 11, wherein, when said utilization exceeds a reservation period, an additional charge is accrued and billed to said customer.

14. The computer system of claim 8, further including a seasonal adjusting utility that dynamically increases customer's cost for said space during seasons/periods with a high number of reservations.

15. The computer system of claim 8, wherein said location is a car park for parking at an airport terminal, wherein said computer system is linked to a flight reservation system and includes:
means for automatically querying an airline passenger booking a reservation within a flight reservation GUI whether the airline passenger desires to park a vehicle within the car park; and
means for processing a request for a parking reservation at a the car park of the airport terminal upon selection by the airline passenger of a car parking reservation option from within the flight reservation GUI of the flight reservation system.

16. The computer system of claim 8, wherein said location offers open reservation that allows any one of a plurality of spaces within said location to be utilized by a customer with a reservation coupon.

17. A computer program product comprising:
a computer readable medium;
program instructions stored on said computer readable medium for:
managing a database of locations that each provide a plurality of spaces that may be reserved;
providing a graphical user interface that receives a customer's request for a space at one of said locations and an availability utility that determines whether said space is available;
providing an electronic payment method for receiving payment for an issued reservation corresponding to said reservation request;
in response to said space being available and receipt of payment, outputting to said customer a printable reservation coupon containing information by which access to said one location is controlled, wherein when the reservation assigns a particular space among the plurality of spaces, the reservation coupon also includes a space identifier indicating the particular space that is assigned to the reservation; and
tracking use of the space and updating available remaining spaces within the location by receiving data about which reservation coupons are presented at the entrance and exit of the location.

18. The computer program product of claim 17, wherein said program instructions further comprise instructions for:
monitoring a number of spaces available at each of said locations; and
in response to a reservation request for a location that has less than a predetermine number of spaces available, activating an auction for each of said number of spaces available, wherein each space is bided for by one or more customers desirous of reserving the space and the space is reserved to a highest bidder among the one or more customers.

19. The computer program product of claim 17, further comprising program instructions that control receipt of information from a location monitoring mechanism that monitors an entrance and exit of said location to determine when said space is utilized and provides feedback of a utilization of said space.

20. The computer program product of claim 17, further including program instructions for implementing a season adjusting utility that dynamically increases customer's cost for said space during a high reservation period.

21. The computer program product of claim 17, further comprising program instructions for executing an extension utility that allows said customer to extend a reservation request after an initial reservation has been received, wherein when the reservation if for a specific space, the period associated with the customer's coupon code is dynamically adjusted to reflect additional period added by the request to extend the reservation.

22. The computer program product of claim 17, wherein said computer program controls a car parking reservation system for parking a vehicle at an airline terminal, wherein, when said car parking reservation system is linked to a flight reservation system, said program instructions for controlling said car parking reservation system includes instructions for automatically processing a request for a reservation at a terminal parking facility by selecting a car reservation option from within a flight reservation GUI.

23. A method, carried out by a server communicatively connected to a plurality of clients in a network environment, for managing a parking location having a plurality of separate parking spaces, said method comprising:

receiving, from one of said clients, a parking request for said parking location for a specific duration of time between a beginning time and an ending time;

accessing a database and determining a status of the parking location during the specific duration of time;

receiving an electronic payment for an issued reservation corresponding to said reservation request;

sending, over the network to the client, a printable reservation ticket having machine readable information including the beginning time and the ending time and identification information for a user using the client to make the parking request, wherein when the reservation ticket assigns a particular space among the plurality of separate parking spaces, the reservation ticket also includes a parking space identifier indicating the particular parking space that is assigned to the reservation; and tracking use of the space and updating availability of remaining spaces within the location by monitoring which reservation coupons are presented at the entrance and exit of the location.

24. The method of claim 23 further comprising:

receiving a request to extend the duration of time with a new ending time for a parking request; and updating the database with the new ending time.

25. The method of claim 23, further comprising:

receiving information generated from the parking location as to an actual time that a car of the user enters and leaves the parking location; and correlating the received information with the identification information read at the parking location from the machine readable information of the reservation ticket used for the car by the user.

26. The method of claim 25, further comprising an automatic billing system based upon the received information for billing a user identified from the identification information an amount based upon the actual time the car entered and exited the parking location and based upon whether the time was within a reserved time specified in the reservation or an extension added to the reservation.

27. A method, carried out by a server communicatively connected to a plurality of clients in a network environment, for managing a parking location having a plurality of separate parking spaces, said method comprising:

receiving, from one or more of said clients, a parking request for said parking location for a specific duration of time between a beginning time and an ending time;

accessing a database and determining a status of the parking location during the specific duration of time;

initiating an auction for allocating a parking reservation for the parking location if the status of the parking location indicates a certain level of demand during the duration of time that is above a preset threshold level, wherein the parking request associated with the highest bidder is allocated the parking reservation and wherein, when the level of demand is not above the preset threshold level, the parking reservation is allocated without an auction;

receiving an electronic payment from a winner of the auction for an issued reservation corresponding to said parking request;

sending, over the network to the client, a printable reservation ticket having machine readable information including the beginning time and the ending time and identification information for a user using the client to make the parking request, wherein when the reservation ticket assigns a particular space among the plurality of separate parking spaces, the reservation ticket also includes a parking space identifier indicating the particular parking space that is assigned to the reservation; and tracking use of the space and updating availability of remaining spaces within the location by monitoring which reservation coupons are presented at the entrance and exit of the location.

28. A method, carried out by a server communicatively connected to a plurality of clients in a network environment, for managing a parking location having a plurality of separate parking spaces, said method comprising:

receiving, from one of said clients, a parking request for said parking location for a specific duration of time between a beginning time and an ending time;

accessing a database and determining a status of the parking location during the specific duration of time; and automatically notifying a valet service to pick up a car at a designated location and to park the car at the parking location if the status of the parking location indicates an availability of one of the separate parking spaces for the duration, wherein the valet service electronically receives a reservation ticket for the parking location generated by the parking request and returns the car to the designated location for pick up by the customer who dropped off the car;

sending, over the network to the client, a printable reservation ticket having machine readable information including the beginning time and the ending time and identification information for a user using the client to make the parking request, wherein when the reservation ticket assigns a particular space among the plurality of separate parking spaces, the reservation ticket also includes a parking space identifier indicating the particular parking space that is assigned to the reservation; and tracking use of the space and updating availability of remaining spaces within the location by monitoring which reservation coupons are presented at the entrance and exit of the location by the valet.

\* \* \* \* \*